United States Patent
Scherer et al.

(10) Patent No.: US 6,772,033 B2
(45) Date of Patent: Aug. 3, 2004

(54) MANUFACTURING NETWORK SYSTEM

(75) Inventors: Johann Scherer, Noerdlingen (DE); Klaus Wohlfarth, Satteldorf (DE)

(73) Assignee: Cooper Power Tools GmbH & Co. (DE)

( * ) Notice: Subject to any disclaimer, the term of this patent is extended or adjusted under 35 U.S.C. 154(b) by 56 days.

(21) Appl. No.: 10/236,299

(22) Filed: Sep. 6, 2002

(65) Prior Publication Data

US 2003/0109947 A1 Jun. 12, 2003

Related U.S. Application Data

(63) Continuation of application No. PCT/EP00/12800, filed on Dec. 15, 2000.

(30) Foreign Application Priority Data

Mar. 9, 2000 (DE) .......................................... 200 04 400

(51) Int. Cl.[7] .............................................. G06F 19/00
(52) U.S. Cl. .......................... 700/115; 700/96; 707/10; 709/106
(58) Field of Search ................................. 700/108, 112, 700/115, 110, 96; 709/106; 707/10

(56) References Cited

U.S. PATENT DOCUMENTS

| | | | | |
|---|---|---|---|---|
| 4,953,277 A | * | 9/1990 | Crispin et al. ............ | 29/407.05 |
| 5,153,839 A | * | 10/1992 | Cross ......................... | 700/112 |
| 5,325,582 A | * | 7/1994 | Glaser et al. ............... | 700/115 |
| 5,367,624 A | | 11/1994 | Cooper | |
| 5,530,857 A | * | 6/1996 | Gimza ......................... | 707/10 |
| 5,710,708 A | | 1/1998 | Wiegand | |
| 5,877,961 A | * | 3/1999 | Moore ......................... | 705/29 |

FOREIGN PATENT DOCUMENTS

| | | |
|---|---|---|
| DE | 19617181 A1 | 12/1996 |
| DE | 19614748 A1 | 10/1997 |

OTHER PUBLICATIONS

Article entitled "New CNC Controller is 'Fully Open'" by Mark T. Hoske; Control Engineering/Nov. 1996; 1 page.
Article entitled "Beispiel einer auf Standards basierenden Kommunikationsinfrastruktur fur CIM" by Adam, H. Linnemann and Z. Menevidis; CIM—Rechnerintegrierter Fabrikbetrieb, 1992; 2 pages.

\* cited by examiner

*Primary Examiner*—Albert W. Paladini
(74) *Attorney, Agent, or Firm*—Coats & Bennett, P.L.L.C.

(57) ABSTRACT

A manufacturing network system comprises at least one master computer and at least one network computer linked therewith for the purpose of network management. The network computer is linked with a number of local control devices in the area of assembly lines, work stations, or the like. The local control devices are associated with field devices, such as initiators, actuators, screw control modules, or the like, of which corresponding work devices are controllable and/or actuable along the assembly lines, in the work stations, or the like. The net server is provided with a number of software modules and/or is linked with software modules in the manufacturing network system for the purpose of data acquisition, management and/or evaluation. The system provides a manufacturing network system which facilitates collection, storage, management and evaluation of data in many ways, and which allows queries at almost any point of the network system.

46 Claims, 13 Drawing Sheets error indications

Error number 102

Error number: 102

Error text: Group alarm plant 3    Factor availability reduction: 1

☑ Confirm message
☑ Handle message

Place of occurrence: Sterilization of packaging means

Error type: technical machine failure

File path of graphics file: C:\Programs\   \Projects\Events   [Search...]

☑ Display graphics

File path of video file:    [Search...]

☐ Display video

[Terminate]

*FIG. 9*

MANUFACTURING NETWORK SYSTEM

This application claims priority from German Patent Application No. 200 04 400.1, which was filed on Mar. 9, 2000 and is a continuation of PCT Application No. PCT/EP00/12800, which was filed on Dec. 15, 2000, and which are incorporated by reference herein.

BACKGROUND OF THE INVENTION

The present invention refers to a manufacturing network system comprising at least one master computer and at least one network computer linked therewith for the purpose of network management, said network computer being linked with a number of local control devices in the area of assembly lines, work stations, or the like, which local control devices are associated with field devices, such as initiators, actuators, screw control modules, or the like, of which corresponding work devices are controllable and/or actuable along the assembly lines, in the work stations, or the like, the network computer being provided with a number of software modules and/or being linked with software modules in the manufacturing network system.

It is known from practice that at present e.g., in car manufacturing various work stations are arranged along assembly lines, the work stations having inter alia assigned thereto control devices for screwers. With such a control device, it is possible to control a plurality of screwers and to monitor the action thereof e.g., with respect to torque. Known are also decentralized control devices, for instance, for workpiece carriers. For instance, part of the automotive vehicle can be moved along various work stations for the purpose of assembly on such a workpiece carrier. A higher-level computer is normally responsible for coordinating the workpiece carriers.

Many other working activities are carried out along such an assembly line, the corresponding working means being locally controlled or programmed as a rule without any corresponding status feedback to a central computer or master computer.

As a consequence, information on the various working activities, the progress of said activities, the time sequence of various working activities, or the like, can normally not be called, evaluated or monitored at a central place. For instance, there is also no appropriate storage of data of the various work stations and/or of data regarding parts of an automotive vehicle or the automotive vehicle on the whole during its manufacture. By analogy, it is also not possible to obtain information from the overall system through access in the area of the local devices, in particular, with respect to a product to be manufactured, or orders regarding a specific product, or the like.

It is therefore the object of the present invention to provide a manufacturing network system in which data are collected, stored, managed and evaluated in many ways, and in which queries are possible at almost any point of the network system. This object is achieved by the features of claim 1.

SUMMARY

At least one network computer is linked with a master computer at a planning level within the network system. Said network computer serves to acquire, manage and/or evaluate data. A plurality of local control devices are connected to the network computer. These devices are assigned to an assembly line, a work station or also several work stations separately or also in the area of the assembly line. Data are exchanged between local control device and network computer, and said data exchange may concern operating data and e.g., also control data. Such operating data are e.g., data on the field devices assigned to the local control device, their activities, times of use, or the like. Furthermore, such data may be alarm messages, failure messages, etc. The data exchange between network computer and local control devices is normally bidirectional, so that corresponding data can also be transmitted to the local control devices, for instance for the purpose of programming, or can be called therefrom by the network computer.

The connection between network computer and master computer may also be bidirectional, so that the network computer can be queried by the master computer, and vice versa.

Each of the local control devices comprises a connection to at least one field device which is controlled, monitored, programmed, or the like, by the local control device. Such field devices may be screwer controls, initiators, actuators, or the like, which control and monitor screwers accordingly and operate, control, monitor, or the like, other devices of the corresponding work station.

To acquire, manage, evaluate, distribute, etc., specific data in accordance with the requirements in this context, software modules are or can be installed within the manufacturing network system, and can e.g., be stored on the master computer, the network computer or the local control devices or further computers in the network system or can be called there via the network. The network computer coordinates and manages the data flow within the network system and between the various software modules.

Different protocols for taking over and transmitting data are known for such networks. One example is the TCP/IP reference model or also internet reference model which permits the transmission and transfer of data from and between different computers and networks and, in particular, communication between transport layer and internetwork layer. It is also possible to communicate on a so-called application layer within the manufacturing network system, the corresponding application protocols therefor being FTP, SMTP, HTTP, or the like. For instance, various web browsers are based on HTTP for providing web pages which may contain a mixture of texts, graphics, sound and video data. A corresponding communication between the various components of the manufacturing network system is also possible via such web pages and corresponding hyperlinks.

Some of the abbreviations used shall now be explained in the following:

| | |
|---|---|
| TCP/IP | transmission control protocol/internet protocol |
| FTP | file transfer protocol |
| SMTP | simple mail transfer protocol |
| HTTP | hypertext transfer protocol |
| SQL | structured query language |
| CAQ | computer aided quality control |
| DDE | dynamic data exchange |
| ODBC | open database connectivity |
| SPS | programmable control system (programmable controller) |
| LAN | local area network |
| WAN | wide area network |

The various software modules within the manufacturing network system may, e.g., include a program diagnosis module. Said module serves, in particular, to diagnose lower-level network components, such as local control device, communication link, field device, or the like.

The program diagnosis module may comprise a programming tool through which e.g., programming can take place from a central place of the network system.

To be able to make a remote diagnosis also from outside the manufacturing network system still within an intranet, or even from an extranet, the manufacturing network system may comprise a corresponding interface, for instance, for connection to the internet. Such a remote diagnosis could e.g., by carried out by suppliers of local control devices or field devices. The remote diagnosis may also serve to check screwers, measuring devices of the work station, or the like.

To be able to make a remote diagnosis independently of different manufacturers of different network components, such a lower-level network component with respect to the program diagnosis module may comprise a user-independent interface.

To obtain information, in particular, on lower-level network components, their states, interactivities, or the like, a software module may be a logbook module. In such a logbook module, corresponding versions, extensions, or the like, of the network can be stored and called again.

If there is an error message within the system, the system states can be checked through the logbook module to localize the fault or error, if necessary.

It is here possible to program corresponding system states for at least one input mask of an input means of the manufacturing network system.

To be able to adapt the logbook module to system changes and extensions in a simple way, such changes in the system can be entered and/or stored in the logbook module.

Moreover, the logbook module may comprise a clearance device through which calls and queries by network-external participants are e.g., possible via a modem, or the like.

It is also possible to change data existing in specific logbooks, and the structures thereof, by means of the logbook module and to store these in the network system.

To be able to provide information on maintenance and repair in the network system, a software module may be a maintenance module. This module contains the necessary maintenance and repair activities for the operator of the network system. An input is here possible via a corresponding input means in the network system with respect to these various activities. An internal repair can be notified through the maintenance module by sending a corresponding message. Furthermore, a corresponding confirmation message can be entered in the maintenance module, the message marking the end of the maintenance or repair activity.

Furthermore, the maintenance module may comprise a calculating means which e.g., calculates maintenance intervals in dependence upon an actual time of use, in particular, of a corresponding field device.

Furthermore, the maintenance module can control a display means for displaying a layout plan, in particular, of local control devices and/or field devices. In this display, corresponding components of the local control devices or the field devices may be highlighted for which maintenance or repair is intended. Accordingly, a message may also be sent directly by the maintenance module to the component of the network system to be maintained, for instance, in order to suppress the further use thereof and/or to replace said component by another component. The maintenance module may also output a list of the corresponding repair activities for the corresponding network component via an output means, such as a screen, printer, or the like.

To archive process data, user data and/or system data, a software module may be a data archiving module. Said software module allows the input of corresponding data archives via input means of the network system. Here, an archiving operation can be carried out automatically, e.g., at fixed time intervals, with respect to specific network components, or the like.

To archive logbooks prepared e.g., by means of the logbook module, data archiving module and logbook module may be connectable or connected in particular automatically for data transmission.

To obtain information, if necessary, on corresponding system changes, the data archiving module may contain an actual data set and at least one precursor version of the actual data set.

Furthermore, the data archiving module can be called and queried to obtain data on access rights by external systems, and to determine when and how often such external accesses might have taken place.

To obtain very different data about machines and their operation, a software module may be a machine and/or operating data acquisition module (MDE/BDE module). Such data are e.g., type and number of specific machines, optionally malfunctions of said machines, or logistical malfunctions assigned to the machine, warnings about operative states of the machine, such as excessive temperature of the oil, or the like, reports on lack of material, minimum amounts, number of pieces, or the like, and on the mode of operation of the machine, such as automatic operation, manual operation, maintenance, or the like.

The corresponding MDE/BDE module can directly communicate with the various machines via a TCP/IP connection to provide an actual state of the corresponding machines without any considerable time delay.

In this connection it is also of advantage when the data of the MDE/BDE module can be displayed by an output means and/or transmitted to further software modules. For instance, the above-mentioned states can be evaluated and displayed in time and graphically. The display may take place via a screen, a printer or also via transmission via a modem, or the like. On the basis of the data of the MDE/BDE module, work load and availability of a corresponding machine or also of the whole system can be calculated by a corresponding calculating means of said module for defined periods of time and may be displayed.

Via the MDE/BDE module, it is also possible to record time, personnel or set-up time for one or several machines. Likewise, automatic shift protocols, feedback by reporting systems to work places, etc., are possible in connection with said module.

To permit an overview of the whole company plant assigned to the network system, a software module may be a plant overview module for outputting at least operative states and plant overviews. With this module, it is e.g., possible to show states of work stations, transportation sections of the assembly lines, or the like. Furthermore, there may be simplified displays of the whole plant, a workpiece carrier flow diagram, or the like. As already stated in connection with the former software modules, the plant overview module can also communicate with the corresponding other software modules for exchanging data. The various modes of operation of the different work stations and machines can e.g., be graphically highlighted in a corresponding plant overview by the module on the basis of the data received from the MDE/BDE module.

For the input and/or provision of orders to be particularly controlled by the field devices, a software module may be an order module. The corresponding input can be made on a computer or by means of a corresponding input means within the manufacturing network system. It is possible to transmit the corresponding data directly via TCP/IP or to write the data onto a mobile data carrier.

The corresponding order data regard, for instance, the type of handling, desired working time, working sequence, or the like. Furthermore, an appropriate assignment of the respective work to a specific work station can be carried out by the order module. Like the already mentioned software modules, the order module can communicate with the other software modules. Moreover, the order module may have corresponding input/output means to output, e.g., a day forecast or also a day review with respect to the corresponding operations for handling the orders. Furthermore, order data may e.g., be output in encoded form as bar codes, labels, or the like, and can be decoded at the corresponding work stations by scanners, or the like.

To be able to carry out a quality check after completion of corresponding working steps in various work stations and to archive corresponding data, a software module may be a quality management module.

To be able to control and monitor the various field devices in the different work stations along the assembly line, the local control device may comprise a computer, in particular personal computer. At least parts of the above-mentioned software modules may be stored thereon. A local operation of the corresponding field devices is possible with the computer. Furthermore, operative states, alarms, messages, or the like, of the various field devices can already be received and evaluated here. The computer communicates via TCP/IP with the network computer and is connected via said computer, or also via a direct communication connection, to the master computer.

To be able to operate the local computer in an easy way, said computer may comprise a touch-sensitive screen. Specific sequences or queries displayed on the screen can thereby be started directly by touching corresponding symbols or icons.

The corresponding computers of the local control device may serve the direct control of the field devices, the computer possessing corresponding interfaces. To be able to carry out the control of such field devices in a more targeted way, the local control device may comprise a programmable controller (SPS) which is, in particular, connected via a bus system to the field devices. Said controller may here communicate via TCP/IP with the computer of the local control device or also directly with the network computer or the master computer.

A so-called Profibus may e.g., be used as a bus system.

To provide, in particular at the level of the control devices, a substitute without any substantial time delay in case of failure of a controller, a programmable control system (SPS) may be a master SPS. The latter ensures data security in case of failure of one of the other controllers. Furthermore, for a redundant system each of the individual controllers may contain data of the predecessor and successor control through the respective controller.

To store all data within the network system and, in particular, to keep them available for queries within the system, the network computer may comprise a database and/or may be connected to a database. For instance, a database directly assigned to the network computer is an actual database which contains the corresponding actual states of the network system and the corresponding components. A further database which, inter alia, contains corresponding desired values for the various components of the network system may be assigned to the master computer. Communication with the databases may take place by means of a corresponding query language, such as SQL, or the like.

Communication with the database takes place on two levels, i.e., with the master computer and also with lower levels of the manufacturing network system assigned to the master computer.

To be able to input, e.g., data for maintenance pictures in the network system, the system may comprise an input means for said data. Said input means is e.g., a further computer within the network system. Corresponding masks for displaying the data can be called both on the network computer and the local control devices. The corresponding data are stored in a database of the network system. Access is via SQL or ODBC. To update the corresponding data, the database may be queried cyclically for changes. The corresponding change values can then be transferred to the respective masks.

To be able to carry out identification, control and monitoring, in particular, in the area of the field devices and the further devices in the area of the assembly lines and work stations, the manufacturing network system comprises corresponding identification, control and monitoring devices. The workpiece carriers that are movable along the assembly line can e.g., by tracked by said devices, whereby actual position, load, speed, etc., of each workpiece carrier is known in the network system.

The link between network system and the corresponding devices of the assembly line, e.g., for moving such a workpiece carrier, may be via Ethernet and by means of TCP/IP. The advantage is that corresponding network cards for industrial use already exist as a rule, that no additional hardware is needed, that there is a high transmission reliability and that the system is relatively inexpensive.

A workpiece carrier may e.g., be identified by a bar code.

To permit an efficiency analysis for optimizing process sequences and a selective evaluation of corresponding process data, the network computer may comprise an event database system consisting at least of database and database connection for collecting data. Furthermore, the use of such a database defines a global interface which can e.g., be queried by a relational database program, a structured query language, or the like.

The database connection can in particular connect database and a system visualization. The connection to the system visualization is through a DDE interface, the data being stored in the database via an ODBC or SQL connection. A database connection could e.g., regard the occurrence of errors in the system. For instance, if an emergency cut-off is operated in the system, this event would be reported via DDE to the network computer. Corresponding data are collected by the visualization, and information, such as error number, process data (pressure, temperature, or the like), etc. is displayed to the user. The user can now relate the error message with the actual cause of the error, e.g., operator in danger, missing packaging means, machine has a problem, etc. This error message is then recorded by the user and the corresponding data set is written into the database.

This applies by analogy to other events in the system, such as facility about to be cleaned, facility starts production, etc.

To further evaluate the data contained in the database of the network computer, the database may comprise a LAN, WAN, intranet connection, or the like, for querying said data. These data can then be transmitted to corresponding computers, or the like, and evaluated there.

On the basis of the data, production sequences and production planning can be optimized. Moreover, defects and reports can be collected in chronological order and e.g., transmitted to the producer of the corresponding plant components. Furthermore, with the event database system, all kinds of extensive recordings from the network system can be related with one another, and evaluations and planning tasks that are tailored to the respective company are possible.

According to the invention, all kinds of events can be recorded continuously by the network computer and its associated event database system, no specific configuration of the individual components being needed because of the network connection, and the various components being able to communicate with one another in a variable way via TCP/IP.

According to the invention an updated overview of the overall state of the network system with the components connected thereto and contained therein is possible, corresponding faults, or the like, being immediately noticeable and assignable. Furthermore, current information of the system on online planning is always available, a direct access to the database being possible. The system visualization is an image of the running process, whereby a clear overview and forward planning are possible.

On the whole, the manufacturing network system, in particular with the network computer and its event database system, permits a constant control of the various activities and processes and their efficiency. As a result, it is e.g., possible to assess the quality of the work or to plan the production capacity.

It is here of further advantage when a configuration tool for the graphic parameterization of the database connection is assigned to the event database system.

The efficiency of the manufacturing network system according to the invention can be improved in that the system visualization is connected to an article managing system and/or an order administration system for the purpose of data exchange.

Operation, in particular, of the network computer and its event database system can thereby be facilitated if the system visualization comprises a number of selection and/or display masks. With the help of such a selection mask, switching to further and detailed visualizations of the system is possible e.g., by clicking on specific symbols. Corresponding display masks can e.g., display actual states of various field devices, or the like, and said display masks can be called via a selection mask. It is thus possible to switch in each display mask to other display or selection masks via symbols.

The selection/display masks can be connected for data exchange and/or for calling corresponding software modules, or the like, to said modules. The connection may be via TCP/IP, HTTP, or the like.

Advantageous embodiments of the invention shall now be explained in more detail with reference to the figures attached to the drawing, in which:

BRIEF DESCRIPTION OF THE DRAWING

FIG. 9 shows an input mask for individualizing an error number;

DESCRIPTION OF THE INVENTION

Figure 1:
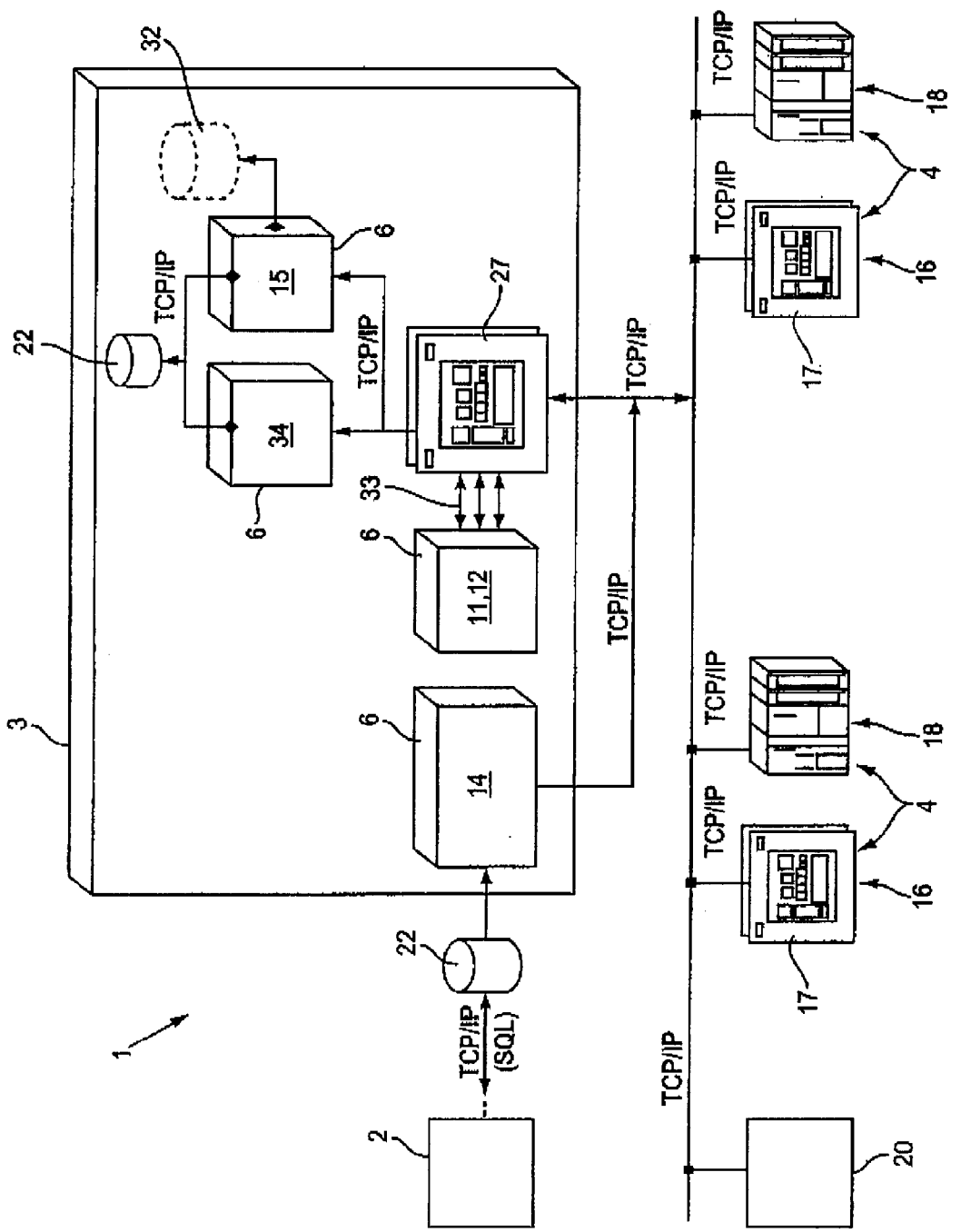
FIG. 1 is a block diagram of a manufacturing network system according to the invention.

FIG. 1 is a block diagram showing a first embodiment of a manufacturing network system according to the invention. The network system comprises various levels. At the highest planning level, a master computer 2 is arranged that has access to a database 22. Access takes place via SQL (structured query language).

At the next lower level of the network system, there is a network computer 3. This computer communicates with the planning level and lower levels of the network system via protocols of the TCP/IP type. The network computer 3 in the illustrated embodiment comprises various software modules 6, such as target order data module 14, machine data acquisition module 11, operating data acquisition module 12, order administration module 34, and quality management module 15. The machine/operating data acquisition module 11, 12 is connected via a DDE channel to a system visualization 27 of the network computer 3. The target order data module 13 is directly connected via TPC/IP to the database 22 and the master computer 2, respectively. On the other hand, there is a direct connection to the next lower level of the network system, i.e., the local level.

The system visualization 27 is also connected via TCP/IP to the order administration module 34 and the quality management module 15. Said modules, in turn, are connected to a database 21 via TCP/IP. The database 21 contains actual data from production, for which the manufacturing network system 1 is responsible.

The quality management module 15 is connected to a further database 32 which may be part of the network computer 3 and may also be arranged externally relative thereto. The database 32 serves, for instance, to collect screwer data or other data of specific tools 39 that are used in production along an assembly line 38 or in work stations 40 in car manufacturing.

At the local level below the network computer 3, there are arranged various local control devices 4 which communicate with one another and also with the system visualization 27 and the target order module 14, respectively, via TCP/IP.

As a rule, the local control devices 4 comprise a computer 16 and a programmable control system 18 (SPS). The computer 16 comprises a touchscreen 17 via which, upon corresponding touching of symbols of the screen, the production assigned to the corresponding local control device 4 can be varied.

At the local level, there is also arranged, in particular, a further programmable control system as a master SPS. It serves data security in case of failure of a local control device.

A production level is additionally arranged below the local level; cf. FIG. 2. The production level is connected via a bus system 19, such as a Profibus, to the SPS 18. At the production level, corresponding field devices 5 are arranged, e.g., initiators, actuators, screwer controls, or the like.

From the production level, corresponding data of the field devices 5 and of the work stations 40 screwers 39 or the like, connected to said devices can be transmitted to the local level and the components arranged thereat. The data are transmitted from there via TCP/IP to the higher levels.

It should here be noted that the software modules 6 shown in FIG. 1 can also be realized fully or in part at the planning level or the local level.

Figure 2:
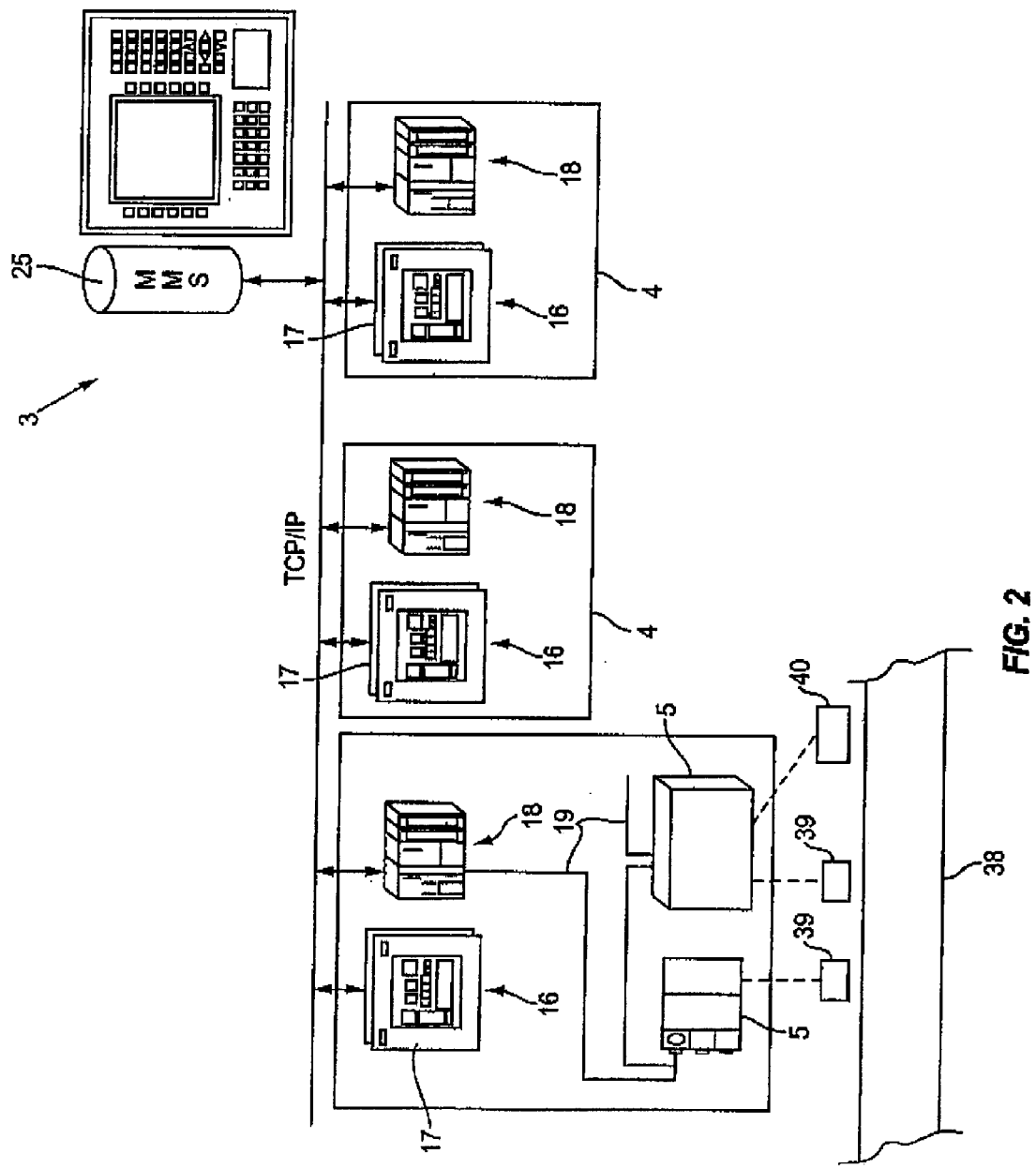
FIG. 2 shows a second embodiment for a manufacturing network system according to the invention.

FIG. 2 shows the network computer 3 with an event database system 25 as a further embodiment of a manufacturing network system. At the lower local plane, the local control devices, i.e., computer 16 and SPS 18, are arranged accordingly. A number of field devices 5 can be connected to each SPS via a bus system 19. For the sake of simplification, FIG. 2 shows a corresponding production level only in connection with a local level.

Figure 3:
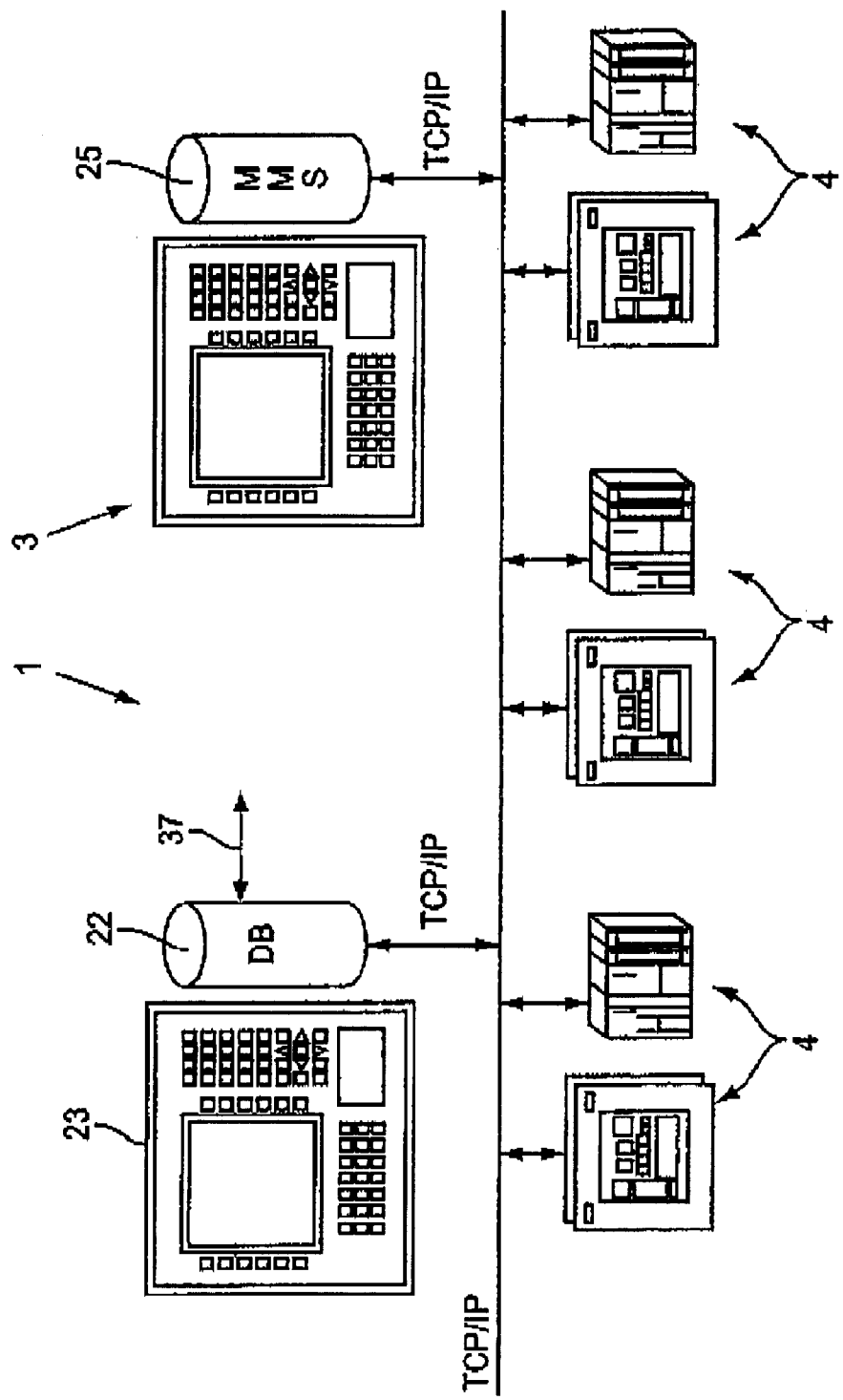
FIG. 3 shows a manufacturing network system according to FIG. 2 with additional input means.

FIG. 3 shows a further embodiment of a manufacturing network system 1 according to the invention. In addition to the embodiment shown in FIG. 2, an input means 23 is here arranged in the form of a computer with associated database 22 which communicates via TCP/IP with the local level and also with the network computer 3. Via a query means 37, the database 22 can also be called directly from the network computer 3 or from the computers of the local control device 4.

With the input means 23, it is e.g., possible to input data for maintenance pictures which can be converted both in the network computer 3 and the local computers into corresponding maintenance masks. The associated data are stored in the database 22 and can be queried from there cyclically via SQL, ODBC, or the like, and entered into the corresponding masks.

The communication between the various components of the network system may e.g., take place via Ethernet and TCP/IP. Corresponding network cards are already available for Ethernet and are relatively cheap. Ethernet is characterized by a very high transmission reliability.

Figure 4:
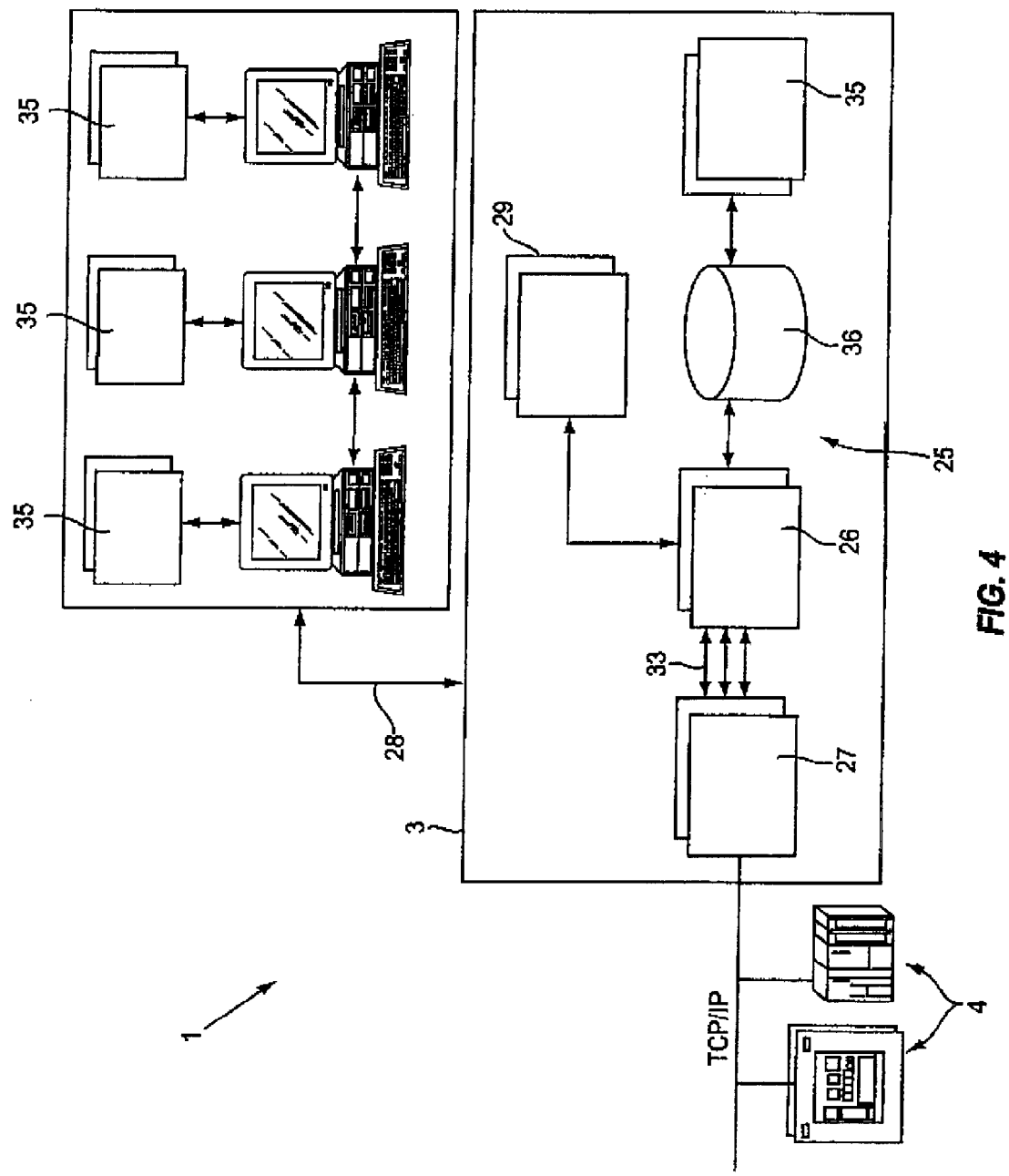
FIG. 4 shows a network system by analogy with FIG. 2 with additional LAN connection.

FIG. 4 shows in detail the network computer 3 with its event database system 25 as a further embodiment of the manufacturing network system 1. The event database system comprises a database which is e.g., realized by hard disks 26 and which has assigned thereto a configuration tool 29, an evaluation tool 35 and a database connection 26. The database connection 26 communicates via DDE (dynamic data exchange) with the system visualization 27. The configuration tool 29 serves the graphic parameterization of the database connection, and the evaluation tool 34 serves to evaluate the data of the hard disks 36.

For access to the event database system 25, the network computer 3 is connected via LAN 28 to a number of further computers which evaluate the contents of the database of the network computer 3 by means of corresponding evaluation tools 35.

Apart from LAN, the connection of the network computer 3 may also take place via WAN, intranet or extranet.

The event database system has several functions, such as support for optimizing the process sequence at the production level, parameterizing the reaction to occurring events, providing a global interface, targeted evaluation of the process data, or the like.

Figure 5:
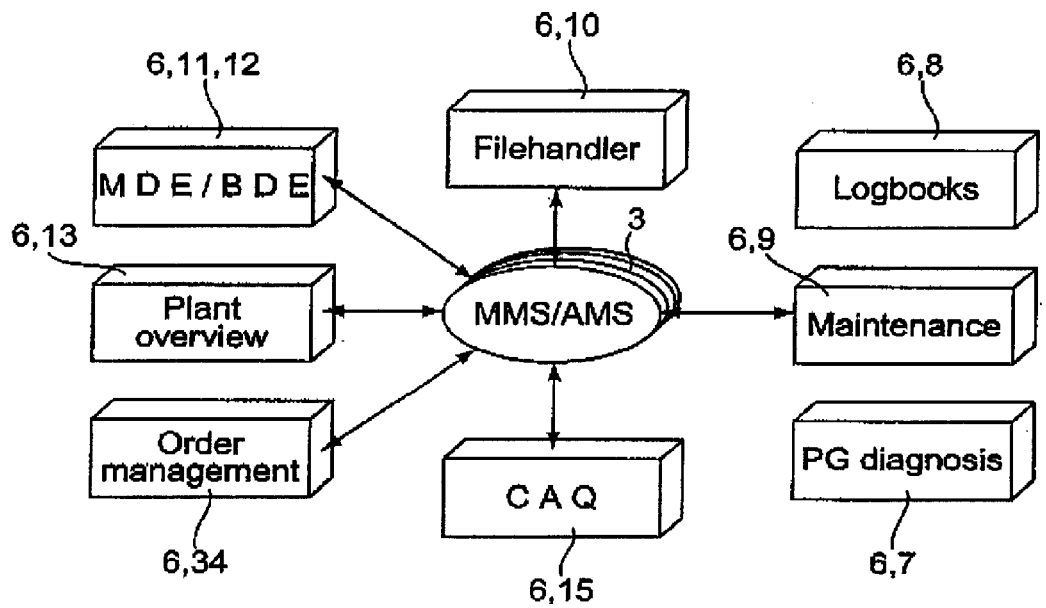
FIG. 5 is a block diagram for illustrating the communication of a network computer with various software modules.

FIG. 5 shows the communication of the network computer 3 with various software modules 6.

One of said software modules is a plant overview module 13. Said module serves, for instance, to display operative states at the production level, to display position and movement of workpiece carriers, see FIG. 6, and to report on the status of various systems at the production level, such as transportation or assembly systems.

A further software module is the order administration module 34. This module gives an overview of the orders to be handled as well as a day forecast and day review on the sequence of various orders and the automatic initiation, change and target control, for instance, of assembly orders along an assembly line in car production.

A further software module is the machine/operating data acquisition module 11, 12. Said module serves to detect faults, warnings, messages, operative modes, etc., which regard various machines at the production level and their operation. Moreover, it is possible to make a statement on the work load of the various machines, a statement on the logistics in connection with the various machines, etc.

Said software module and the remaining software modules are interconnected for data exchange, in particular via the network computer 3, and are also connectable to corresponding output devices. Such output devices are e.g., screen, printer, modem, or the like. Data can be transmitted to external users via a modem, on condition that said users are authorized to access the manufacturing network system.

With a data archiving module 10 (filehandler) as a further software module, data are archived in connection with the running processes at the production level via users and via the system. The archived data are stored in a file. Stored are both an actual archive file and a predecessor to said actual archive file.

A logbook module 9 serves to provide versions, to store version updates, extensions or network failures.

The maintenance module 9 organizes repair or maintenance activities for the various machines, tools or work stations along the assembly lines. Repair can be effected through a corresponding message by the maintenance module. Moreover, confirmation after repair is also possible via the maintenance module. Finally, it is possible to call corresponding layout plans via output means from the maintenance module.

Further software modules 6 are a program diagnosis module 7 and the quality management module 15 (CAQ).

The program diagnosis module 7 serves, for instance, central programming and network diagnosis. A remote diagnosis is also possible through a corresponding connection of the program diagnosis module 7 via a modem, or the like.

The quality management module 15 serves to collect quality data, such as tightening torques of screwers, pressure data, temperature data, etc.

Figure 6:
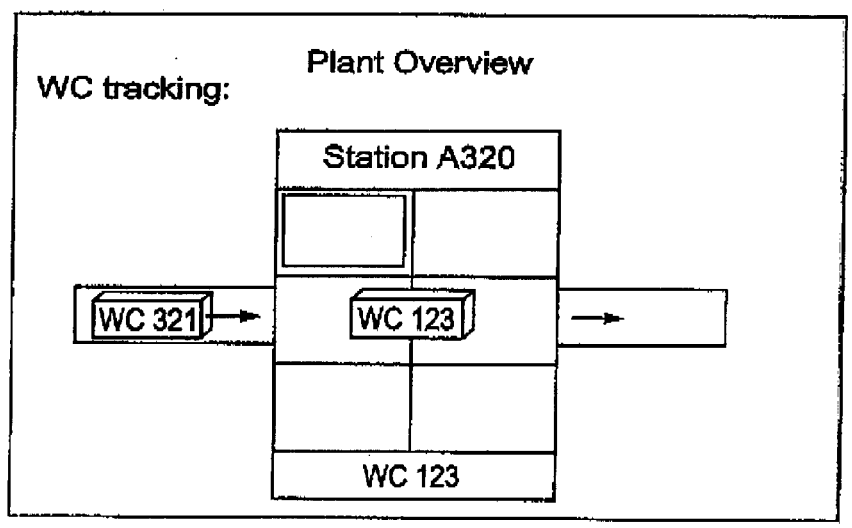
FIG. 6 is an illustration by means of a plant overview module as a software module.

FIG. 6 gives an example of a plant overview which can be realized via the plant overview module 13 according to FIG. 5. In this case a workpiece carrier 123 is arranged in a work station A 320 for working the workpiece disposed on the workpiece carrier. A further workpiece carrier 321 is already arranged in the working direction upstream of station A 320.

Figure 7:
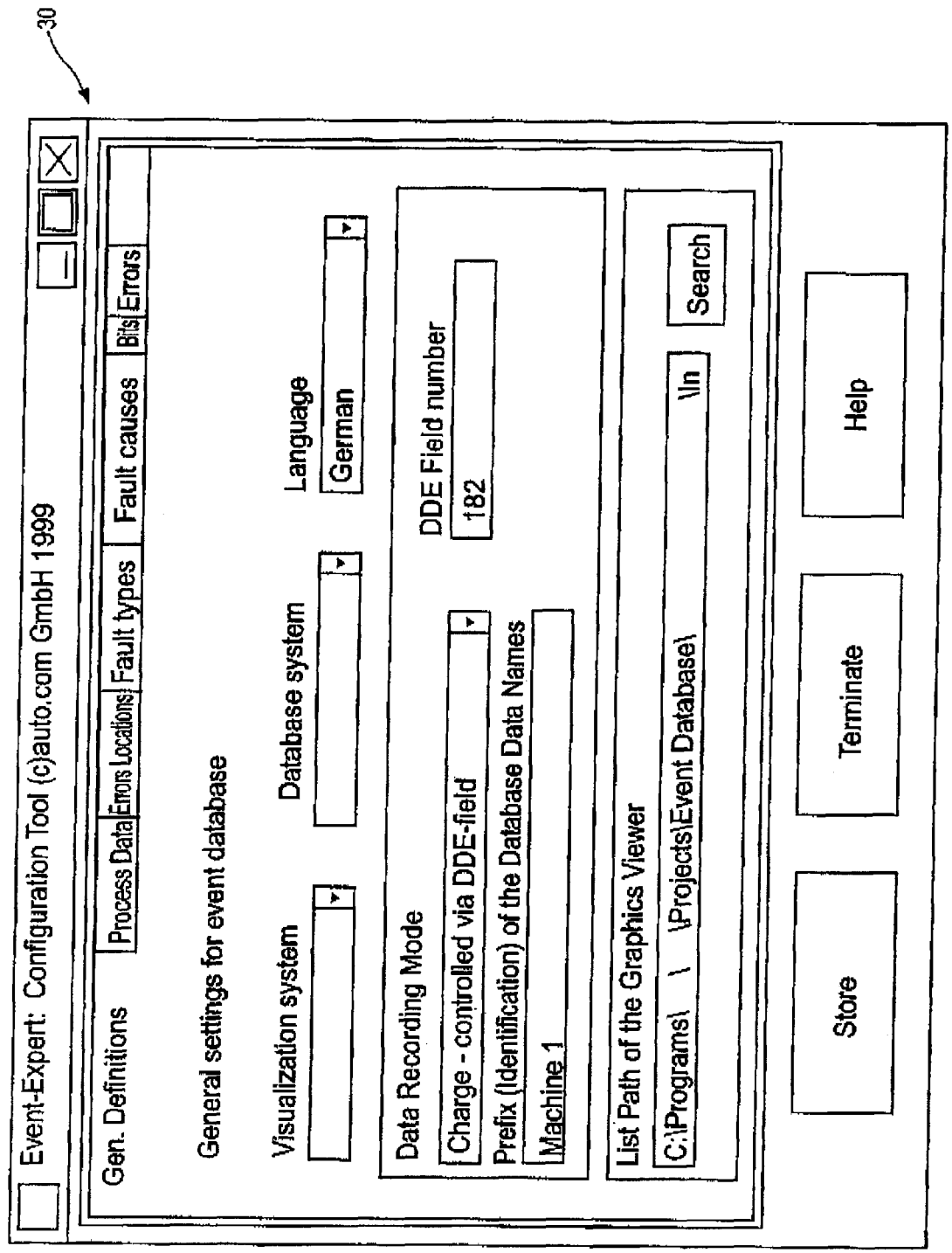
FIG. 7 shows an input mask of a configuration tool of an event database system of the network computer.

FIG. 7 shows a selection mask 30 of the configuration tool 29, see FIG. 4. Said selection mask comprises eight individual masks with different input fields which are partly designed with drop-down menus. Switching to other masks is possible by corresponding selection buttons in the lower area of the selection mask, or specific actions, such as storing, terminating, etc., can be initiated.

Figure 8:
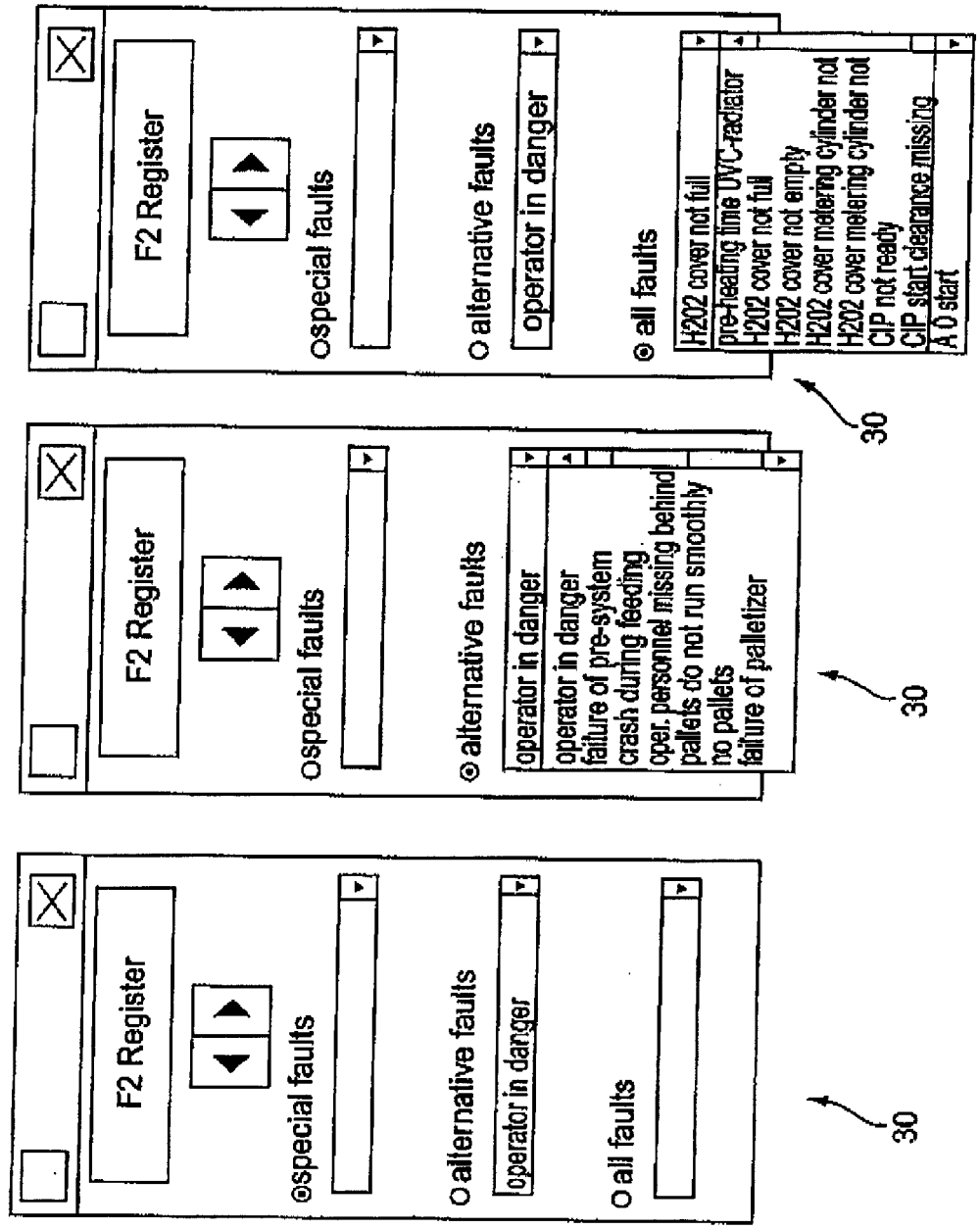
FIG. 8 shows an input mask with different drop-down menus.

FIG. 8 shows various selection masks for error individualization. Switching between the masks is possible by arrow symbols, and the various selection fields have drop-down menus.

From the left to the right in FIG. 8, the selection mask 30 is respectively shown with different drop-down menus.

FIG. 9 shows a further selection mask for the configuration tool 29. In this instance, an error specification of the error number 102 is made through the selection mask.

Figure 10:
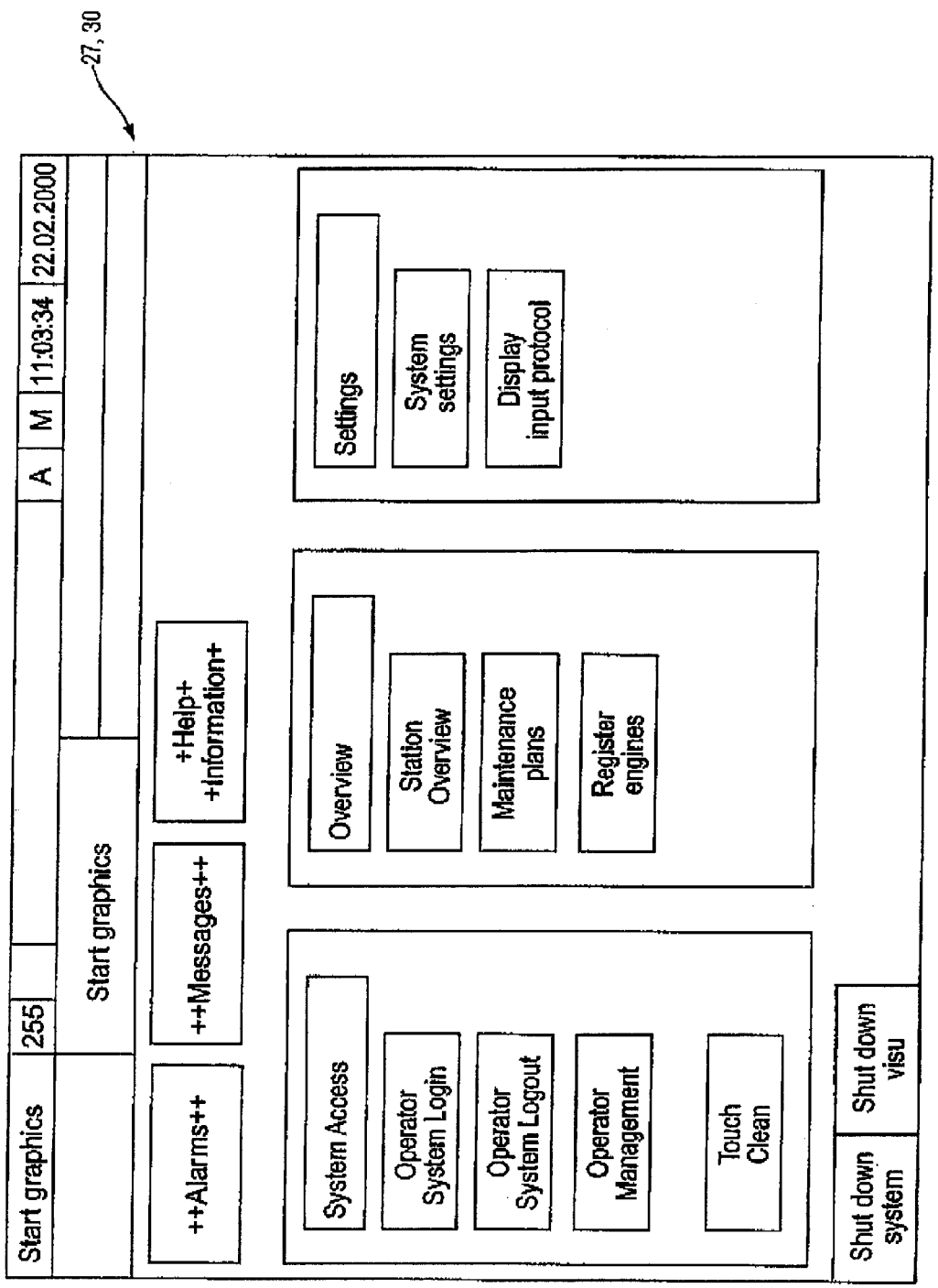
FIG. 10 shows an embodiment of a system visualization.

FIG. 10 shows a start graphic of the system visualization 27 as a selection mask 30 with a number of symbol buttons. In selecting corresponding symbol buttons, it is possible to switch from the start graphic of the system visualization to subsequent masks, as is e.g., shown in FIGS. 11 to 14.

Figure 11:
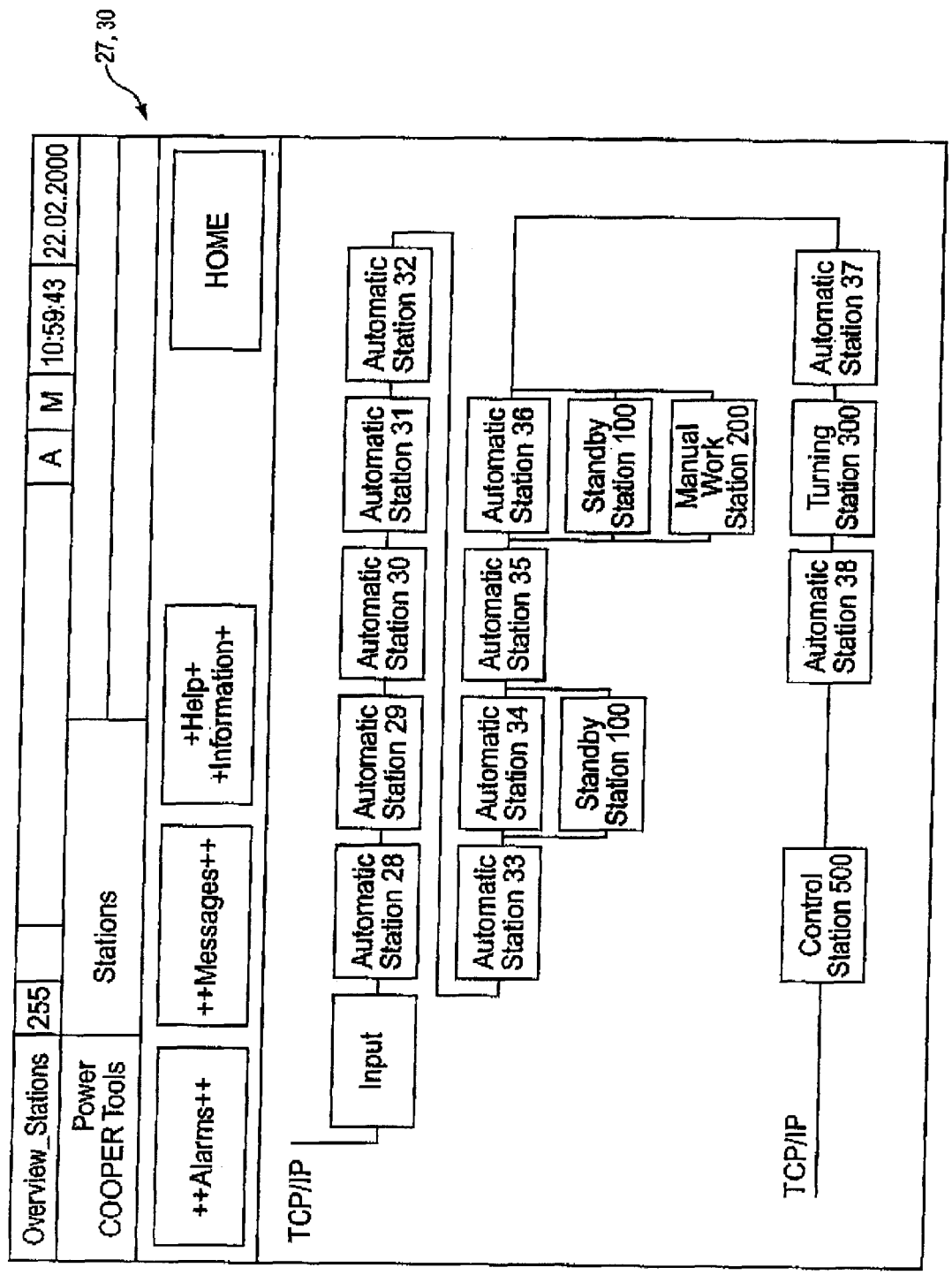
FIG. 11 shows a pop-up submenu according to FIG. 10.

For instance, the selection mask 30 according to FIG. 11 is called by selecting the symbol "station overview" on the start graphic. Various stations are there shown, which can be addressed and communicate by means of TCP/IP.

Figure 12:
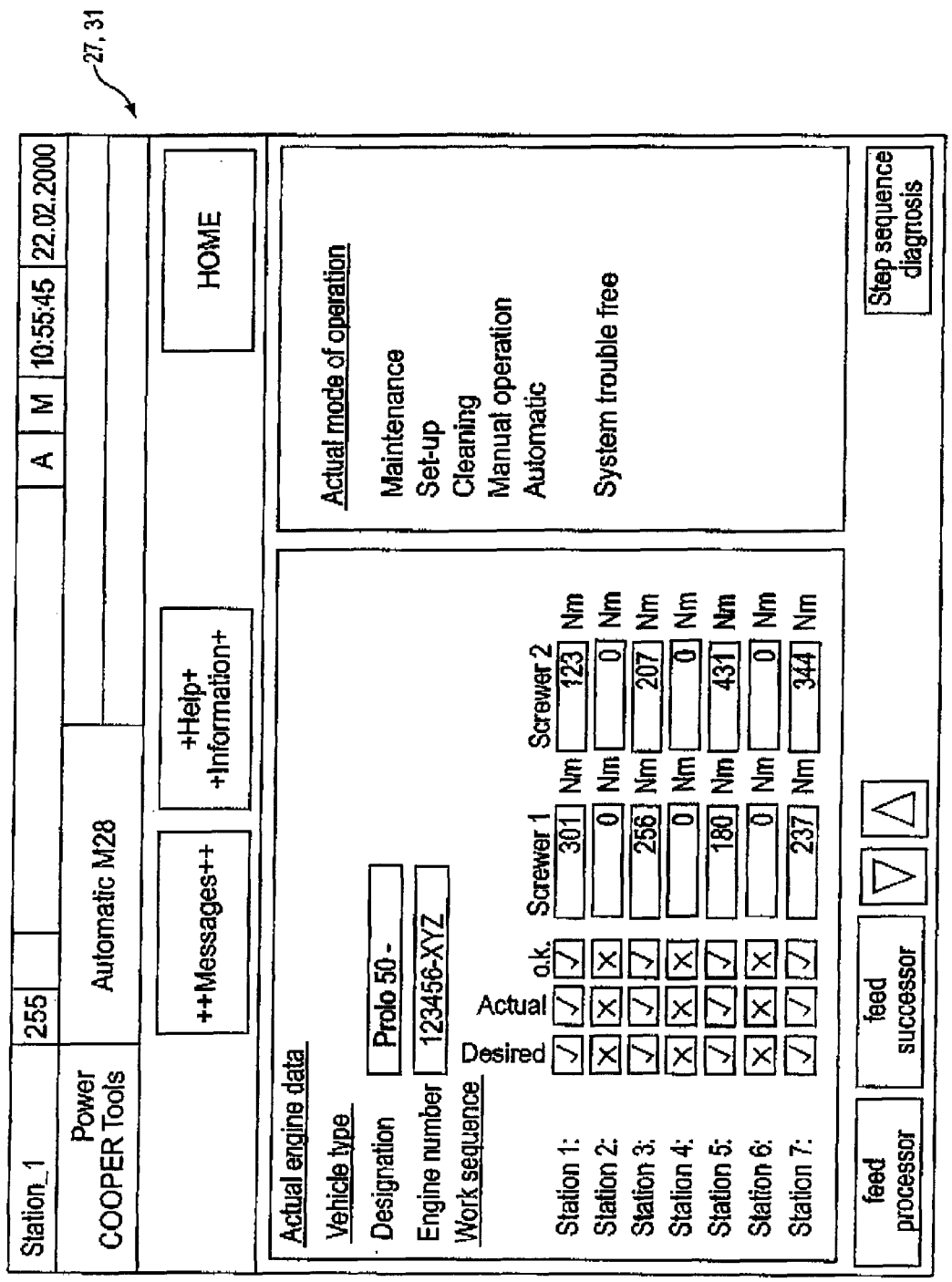
FIG. 12 shows a pop-up submenu according to FIG. 11.

Display mask 31 according to FIG. 12 can e.g., be called by selecting one of the station buttons according to FIG. 11, here automatic station M 28.

Figure 13:
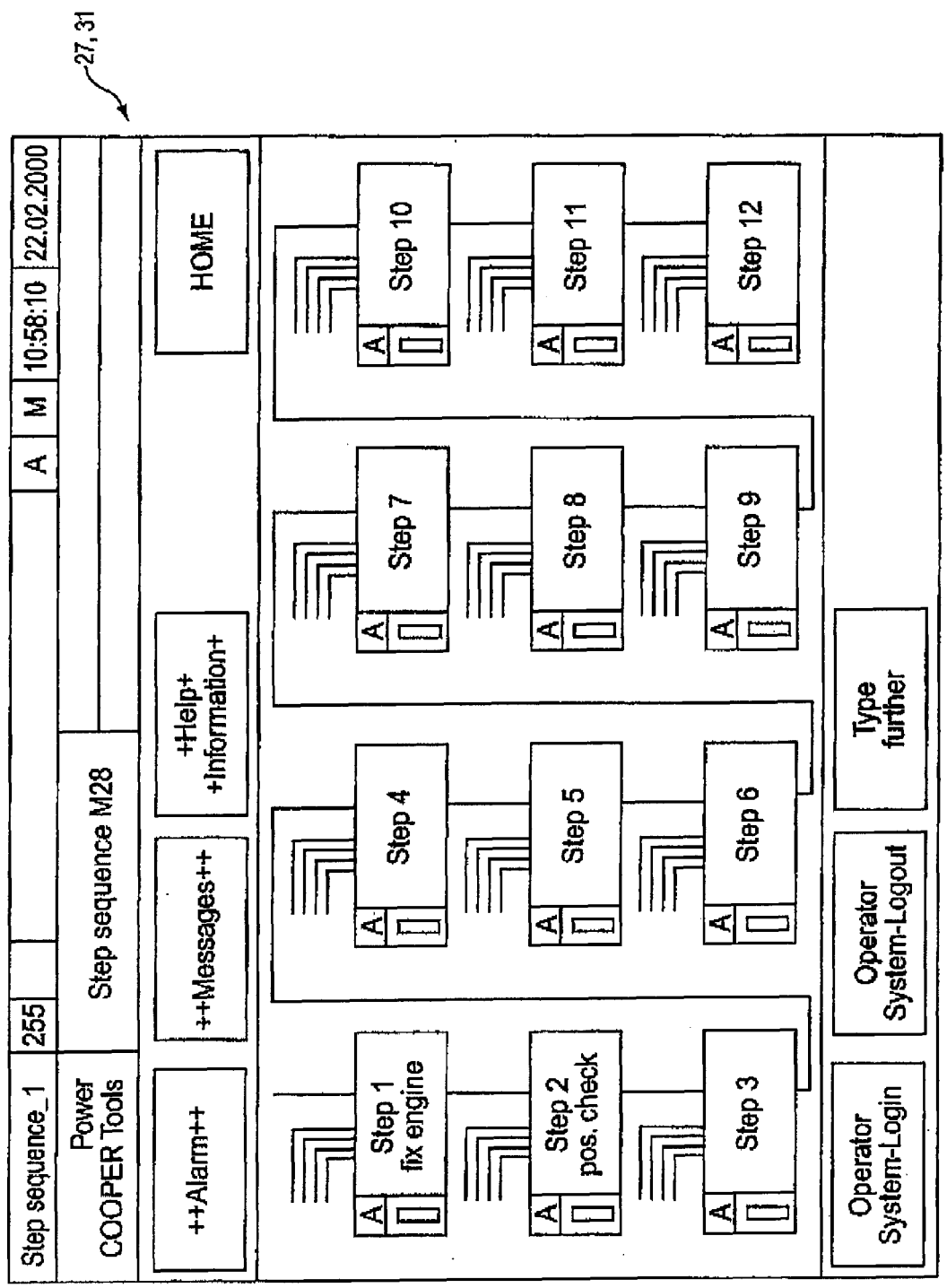
FIG. 13 shows a pop-up submenu according to FIG. 12.

From the display mask according to FIG. 12, one proceeds to the display mask 31 according to FIG. 13 by selecting the symbol button "step sequence diagnosis".

Figure 14:
FIG. 14 shows a display mask for maintenance activities.

By analogy, a display mask 31 according to FIG. 14 can be called by selecting corresponding symbols on the start graphic according to FIG. 10; in said display mask specific maintenance work of a station M 28 is represented both with respect to the time needed and the person responsible for maintenance.

The function of the manufacturing network system according to the invention shall now be described in a few words.

With the network computer, it is made possible—in particular by providing the database assigned thereto and the various software modules optionally distributed in the network system—that process data can be queried via SQL or other database queries for selective evaluation. A global interface is defined, using the database, the interface being usable from all levels of the manufacturing network system. Optionally, access authorizations can be assigned accordingly both within the network system and for external users. The reaction to occurring events can be parameterized by using the network computer and the various input possibilities. Furthermore, an efficiency analysis can be made for optimizing the process sequence.

Various reactions to and effects on the various processes and the control thereof are possible with the manufacturing network system. Data acquisition is primarily possible via local control devices, network computers, etc. for analyzing the processes and their sequences and for optimizing the same. Faults and messages, in particular of the field devices and the local control devices, respectively, can be collected, evaluated and called in chronological order in an easy way. These and all of the further recordings within the manufacturing network system can be related with one another and permit specific evaluation and planning.

With the manufacturing network system according to the invention, a continuous recording of very different events is possible without any specific configuration of the network components and with a corresponding communication via TCP/IP. A group-wide use with corresponding extensions of and changes in the network system is possible in an easy way thanks to the general configuration of the manufacturing network system.

What is claimed is:

1. A manufacturing network system comprising:
   at least one master computer;
   at least one network computer interconnected between said master computer and a plurality of local control devices for the purpose of network management;
   each of said plurality of local control devices located proximate one of an assembly line and a work station and connected with field devices, said field devices selected from the group consisting of initiators, actuators, and screw control modules;
   a plurality of work devices connected to said field devices for being controlled or actuated thereby;
   said network computer being provided with a plurality of software modules, including at least a first software module interconnected with other software modules in the manufacturing network system for the purpose of at least one of the functions selected from the group consisting of data acquisition, data management, and data evaluation, wherein said software modules are interconnected with each other for data exchange and for gueries at a number of points in the network system;
   said first software module being also present in at least a plurality of said local control devices;
   wherein said number of points for said queries including at least plurality of said local control devices.

2. The manufacturing network system according to claim 1 wherein the manufacturing network system takes over and transmits data using a protocol of the TCP/IP type.

3. The manufacturing network system according to claim 1 wherein said first software module is a program diagnosis module for at least diagnosing lower-level network components.

4. The manufacturing network system according to claim 3 wherein said program diagnosis module comprises a programming tool.

5. The manufacturing network system according to claim 3 wherein said manufacturing network system comprises an interface via which at least the program diagnosis module can be called and queried from outside the manufacturing network system.

6. The manufacturing network system according to claim 3 wherein said lower-level network component with respect to the program diagnosis module comprises a user-independent interface.

7. The manufacturing network system according to claim 1 wherein said first software module is a logbook module for displaying lower-level network components and their associated states.

8. The manufacturing network system according to claim 7 wherein system states can be checked from the logbook module in the event of an error message.

9. The manufacturing network system according to claim 7 wherein changes in the network system can be maintained in the logbook module.

10. The manufacturing network system according to claim 7 wherein said logbook module can be cleared for calling by network-external participants.

11. The manufacturing network system according to claim 7 wherein said logbook module contains data in a structure, and wherein at least one of said data or said structure can be changed.

12. The manufacturing network system according to claim 1 wherein the manufacturing network system further comprises an input means for programming system states via at least one input mask.

13. The manufacturing network system according to claim 1 wherein said first software module is a maintenance module with information on maintenance and repair activities.

14. The manufacturing network system according claim 13 wherein the maintenance module can output repair calls.

15. The manufacturing network system according to claim 13 wherein the maintenance module comprises a calculating means for calculating maintenance intervals in dependence upon an actual time of use of the field devices.

16. The manufacturing network system according to claim 13 wherein a layout plan of at least one of said local control devices and said field devices can be called from the maintenance module with highlighting of the corresponding components to be maintained or repaired.

17. The manufacturing network system according claim 13 wherein the maintenance module can receive repair confirmations.

18. The manufacturing network system according to claim 1 wherein said first software module is a data archiving module for archiving data related to at least one of process data, user data and system data.

19. The manufacturing network system according to claim 18 further comprising a logbook module for displaying lower-level network components and their associated states, and wherein said data archiving module and said logbook module are automatically connected for data transmission.

20. The manufacturing network system according to claim 18 wherein the data archiving module contains an actual data set and at least one predecessor version of the actual data set.

21. The manufacturing network system according to claim 18 wherein the data archiving module includes data callable by external systems via access authorization.

22. The manufacturing network system according to claim 1 wherein said first software module is a MDE/BDE module.

23. The manufacturing network system according claim 22 wherein the MDE/BDE module comprises a receiving means for signals by means of a TCP/IP connection corresponding to at least one of the set consisting of machine data and operating data.

24. The manufacturing network system according to claim 22 wherein the MDE/BDE module is connectable to at least one of the group consisting of an output means and a further software module.

25. The manufacturing network system according to claim 1 wherein said first software module is a plant overview module for outputting at least operative states and plant overviews.

26. The manufacturing network system according to claim 1 wherein said first software module is an order module for providing the orders to be particularly controlled by the field devices.

27. The manufacturing network system according to claim 26 wherein the order module contains data relating to at least one of the group consisting of assignment of an order to a work station, order handling by each work station, and desired working times.

28. The manufacturing network system according to claim 26 wherein the order module is connectable to at least one of the group consisting of an output means and a further software module.

29. The manufacturing network system according to claim 1 wherein said first software module is a quality management module.

30. The manufacturing network system according to claim 1 wherein the local control device is a personal computer.

31. The manufacturing network system according to claim 30 wherein the personal computer comprises a touch-sensitive screen.

32. The manufacturing network system according to claim 1 wherein the local control device is a programmable control system which is connected via a bus system to the field devices.

33. The manufacturing network system according to claim 32 wherein said programmable control system is a master SPS.

34. The manufacturing network system according to claim 1 further comprising a database accessible to said network computer.

35. The manufacturing network system according to claim 1 wherein said network system comprises at least one input means for the input of maintenance pictures.

36. The manufacturing network system according to claim 1 wherein said manufacturing network system comprises a tracking means for movable workpiece carriers.

37. The manufacturing network system according to claim 1 wherein said network computer comprises an event database system consisting at least of database and database connection for collecting data.

38. The manufacturing network system according to claim 37 wherein the database connection connects said database and a system visualizer.

39. The manufacturing network system according to claim 38 wherein the system visualizer is connected to at least one of an article managing system and an order administration system for data exchange therewith.

40. The manufacturing network system according to claim 38 wherein the system visualizer comprises a plurality of masks.

41. The manufacturing network system according to claim 40 wherein said masks communicate with at least one software module.

42. The manufacturing network system according to claim 37 wherein said database comprises a connection for querying selected from the group consisting of LAN type, WAN type, and intranet type.

43. The manufacturing network system according to claim 37 wherein a configuration tool is assigned to the event database system for the graphic parameterization of the database connection.

44. The manufacturing network system according to claim 1 wherein said first software module is a logbook module for displaying lower-level network components and component interactions thereof.

45. The manufacturing network system according claim 1 wherein the first software module is selected from the group consisting of a program diagnosis module for at least diagnosing lower-level network components; a logbook module for displaying lower-level network components and their associated states; a maintenance module with information on maintenance and repair activities; a data archiving module for archiving data related to at least one of process data, user data, and system data; a plant overview module for outputting at least operative states and plant overviews; and a quality management module.

46. The manufacturing network system according claim 45 wherein the queries are handled by said first software module.

* * * * *